United States Patent
Ma

(10) Patent No.: US 11,640,832 B2
(45) Date of Patent: May 2, 2023

(54) EMOTION-BASED VOICE INTERACTION METHOD, STORAGE MEDIUM AND TERMINAL DEVICE USING PITCH, FLUCTUATION AND TONE

(71) Applicant: SHENZHEN TCL NEW TECHNOLOGY CO., LTD., Shenzhen (CN)

(72) Inventor: Xiaoli Ma, Shenzhen (CN)

(73) Assignee: Shenzhen TCL New Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/261,832

(22) PCT Filed: Nov. 14, 2019

(86) PCT No.: PCT/CN2019/118580
§ 371 (c)(1),
(2) Date: Jan. 20, 2021

(87) PCT Pub. No.: WO2020/098756
PCT Pub. Date: May 22, 2020

(65) Prior Publication Data
US 2021/0304789 A1 Sep. 30, 2021

(30) Foreign Application Priority Data
Nov. 16, 2018 (CN) .......................... 201811366588.7

(51) Int. Cl.
*G10L 25/63* (2013.01)
*G10L 15/22* (2006.01)
(Continued)

(52) U.S. Cl.
CPC .............. *G10L 25/63* (2013.01); *G10L 15/04* (2013.01); *G10L 15/08* (2013.01); *G10L 2015/088* (2013.01)

(58) Field of Classification Search
CPC ......... G10L 15/22; G10L 15/00; G10L 13/07; H04L 51/02
See application file for complete search history.

(56) References Cited

U.S. PATENT DOCUMENTS

| | | | |
|---|---|---|---|
| 2016/0240213 A1 | 8/2016 | Wen | |
| 2018/0144761 A1 | 5/2018 | Amini et al. | |

(Continued)

FOREIGN PATENT DOCUMENTS

| | | | |
|---|---|---|---|
| CN | 106254186 A | 12/2016 | |
| CN | 106599998 A | 4/2017 | |

(Continued)

OTHER PUBLICATIONS

The World Intellectual Property Organization (WIPO) International Search Report for PCT/CN2019/118580 Feb. 19, 2020 6 Pages (including translation).

(Continued)

*Primary Examiner* — Farzad Kazeminezhad
(74) *Attorney, Agent, or Firm* — Nathan & Associates; Menachem Nathan

(57) ABSTRACT

An emotion-based voice interaction method, a storage medium and a terminal device, the method comprising: receiving voice information to be processed, and acquiring an intent type of the voice information (S10); when the intent type is an emotion intent, determining an emotion type of the voice information (S20); generating a voice response for the voice interaction according to the emotion type, and playing the voice response (S30). The present method can generate a corresponding voice response according to emotion intent, enabling a voice response to match the emotion intent of the user, both realizing voice interaction and achieving emotional interaction, making use more convenient for a user. The emotion type of the voice information (Continued)

is further determined by comparing pitch, fluctuation and tone with corresponding ranges.

14 Claims, 2 Drawing Sheets

(51) Int. Cl.
  *H04L 51/02* (2022.01)
  *G10L 15/00* (2013.01)
  *G10L 15/04* (2013.01)
  *G10L 15/08* (2006.01)

(56) References Cited

U.S. PATENT DOCUMENTS

2019/0019512 A1* 1/2019 Taki .................. G10L 15/00
2019/0325896 A1* 10/2019 Bromand ................ G10L 15/22
2020/0044999 A1* 2/2020 Wu .......................... H04L 51/02

FOREIGN PATENT DOCUMENTS

| CN | 108334583 A | 7/2018 | | |
|---|---|---|---|---|
| EP | 3179475 A1 | 6/2017 | | |
| JP | 3660937 B2 * | 11/2003 | ............. | G10L 13/07 |

OTHER PUBLICATIONS

Communication pursuant to Rule 70(2) and 70a(2) EPC dated Jun. 30, 2022, tor Shenzhen TCL New Technology Co., Ltd., European application No. 19885273.3, filed on Nov. 14, 2019.

* cited by examiner

EMOTION-BASED VOICE INTERACTION METHOD, STORAGE MEDIUM AND TERMINAL DEVICE USING PITCH, FLUCTUATION AND TONE

CROSS-REFERENCES TO RELATED APPLICATIONS

This application is a national stage application of PCT Patent Application No. PCT/CN2019/118580, filed on Nov. 14, 2019, which claims priority to Chinese Patent Application No. 201811366588.7, filed on Nov. 16, 2018, the entire contents of all of which are incorporated herein by reference.

FIELD OF THE INVENTION

The disclosure relates to the technical field of intelligent terminals, in particular to an emotion-based voice interaction method, a storage medium and a terminal device.

BACKGROUND

With the development of artificial intelligence, natural language processing has become an important research direction. In recent years, it has been widely used in different fields, such as home furnishings, automobiles, and educations. Due to the development of artificial intelligence in the language field, in addition to the original remote-control button interaction, touch screen interaction and natural language interaction, man-machine interaction has also entered a new era.

Although artificial intelligence continues to develop rapidly, and the efficiency, accuracy, and intelligence of natural language interaction are also constantly advancing, the dialogues of existing products are still stiff and mechanical, lacking emotion, and can only answer users according to preset fixed strategies. In terms of emotion expression, communication with users at the psychological level cannot produce interaction, and cannot meet the needs of users for human-computer interaction.

BRIEF SUMMARY OF THE DISCLOSURE

In view of the defects of the current technology, the disclosure aims to provide an emotion-based voice interaction method, a storage medium and a terminal device.

The technical scheme adopted by the disclosure is as follows:

An emotion-based voice interaction method includes:
receiving voice information to be processed, and acquiring an intention type of the voice information;
determining an emotion type of the voice information when the intention type is an emotion intention; and
generating a response voice of the voice information according to the emotion type, and playing the response voice.

Further, in one embodiment, the receiving voice information to be processed, and acquiring an intention type of the voice information includes:
receiving the voice information to be processed, performing word division on the voice information to obtain several words, and judging whether the several words being divided include an emotion keyword;
deciding the intention type of the voice information is an emotion intention when the several words include the emotion keyword.

Further, in one embodiment, the receiving the voice information to be processed, performing word division on the voice information to obtain several words, and judging whether the several words being divided include an emotion keyword includes:
receiving the voice information to be processed, and converting the voice information into text information;
dividing the text information into several words, and selecting words meeting a preset condition from the several words being divided; and
judging whether the selected words meeting the preset condition includes the emotion keyword.

Further, in one embodiment, the preset condition is that a part-of-speech of a word does not belong to a preset part-of-speech list.

Further, in one embodiment, the preset parts-of-speech list includes non-key part-of-speech, wherein the non-key part-of-speech is part-of-speech that do not have emotion and action meanings.

Further, in one embodiment, the deciding the intention type of the voice information is an emotion intention when the several words include the emotion keyword includes:
acquiring the number of emotion keywords included when the several words include the emotion keyword;
deciding the intention type of the voice information is the emotion intention when the number is equal to 1; and
detecting whether the emotion types corresponding to the emotion keywords are the same when the number is greater than 1, and deciding the intention type of the voice information is the emotion intention if the emotion types corresponding to the emotion keywords are the same.

Further, in one embodiment, the method further includes:
deciding the intention type of the voice information is an instruction intention if the emotion types corresponding to the emotion keywords are different.

Further, in one embodiment, the method further includes:
deciding the intention type of the voice information is the instruction intention when the voice information does not include the emotion keyword.

Further, in one embodiment, the method further includes:
judging whether the instruction intention can determine the instruction content when the intention type is the instruction intention; and
querying the user in a domain clarification manner until the instruction content can be determined when the instruction intention can determine the instruction content, and executing an instruction corresponding to the instruction intention.

Further, in one embodiment, the method further includes:
generating and playing an excitation voice according to the instruction when the instruction corresponding to the instruction intention is executed.

Further, in one embodiment, the determining an emotion type of the voice information when the intention type is an emotion intention includes:
performing emotion analysis on the voice information to obtain the emotion type corresponding to the voice information when the intention type is the emotion intention, wherein the emotion analysis includes one or more analysis modes of vocabulary emotion analysis, sentence meaning emotion analysis and sound rhythm emotion analysis.

Further, in one embodiment, the generating a response voice of the voice information according to the emotion type, and playing the response voice includes:
generating the response voice corresponding to the voice information according to the emotion type based on an emotion empathy principle and an emotion guiding principle, and playing the response voice, wherein the response voice includes an emotion response statement and a function guiding statement.

Further, in one embodiment, the generating the response voice corresponding to the voice information according to the emotion type based on an emotion empathy principle and an emotion guiding principle, and playing the response voice includes:

generating the response voice corresponding to the voice information according to the emotion type based on the emotion empathy principle and the emotion guiding principle; and acquiring a voice characteristic of the voice information, and playing the response voice according to the voice characteristic.

Further, in one embodiment, the generating the response voice corresponding to the voice information according to the emotion type based on an emotion empathy principle and an emotion guiding principle, and playing the response voice includes:

generating the response voice corresponding to the voice information according to the emotion type based on the emotion empathy principle and the emotion guiding principle; and generating an emotion visual image according to the response voice, and deducing the corresponding response voice through the visual image.

Further, in one embodiment, included before the receiving voice information to be processed, and acquiring the intention type of the voice information is:

activating a voice listening mode and actively playing a preset voice when a voice awakening instruction is received.

Further, in one embodiment, included after the receiving voice information to be processed, and acquiring the intention type of the voice information is:

recording a number of the voice information of which the emotion type is the emotion intention, and activating a preset active emotion mode when the number reaches a preset threshold value, wherein a terminal device actively plays voice in the active emotion mode.

A computer-readable storage medium having one or more programs stored thereon, the one or more programs being executable by one or more processors to implement steps in the emotion-based voice interaction method as described in any one of the above.

A terminal device includes: a processor and a memory;
the memory having a computer-readable program executable by the processor stored thereon; and
the processor, when executing the computer-readable program, implementing steps in the emotion-based voice interaction method as described in any of the above.

A computer-readable storage medium having one or more programs stored thereon, the one or more programs being executable by one or more processors to implement steps in the emotion-based voice interaction method as described in any one of the above.

A terminal device includes: a processor and a memory;
the memory having a computer-readable program executable by the processor stored thereon; and
the processor, when executing the computer-readable program, implementing steps in the emotion-based voice interaction method as described in any of the above.

The beneficial effects are as follows: compared with the current technology, the disclosure provides an emotion-based voice interaction method, a storage medium and a terminal device. The method includes: receiving voice information to be processed, and acquiring an intention type of the voice information; when the intention type is an emotion intention, determining an emotion type of the voice information; and generating a response voice of the voice information according to the emotion type, and playing the response voice. According to the disclosure, the intention type of the voice information is judged, and when the intention type is the emotion intention, the corresponding response voice is generated according to the emotion intention, so that the response voice can be matched with the emotion intention of a user, achieving the emotion interaction while realizing the voice interaction, and bringing convenience to the user during the use.

DETAILED DESCRIPTION OF EMBODIMENTS

The disclosure provides an emotion-based voice interaction method, a storage medium and a terminal device. In order to make the objectives, technical solutions, and effects of the present disclosure clearer and more definite, the present disclosure will be further described in detail below with reference to the accompanying drawings and embodiments. It should be understood that the specific embodiments described herein are merely illustrative of the present disclosure and are not intended to limit the present disclosure.

Those skilled in the art will appreciate that, as used herein, the singular forms "a", "an", "said" and "the" may include the plural forms as well, unless expressly stated otherwise. It should be further understood that the word "comprise" when used in this specification is taken to specify the presence of the features, integers, steps, operations, elements, and/or components, but does not preclude the presence or addition of one or more other features, integers, steps, operations, elements, components, and/or combination thereof. It will be understood that when an element is referred to as being "connected" or "coupled" to another element, it can be directly connected or coupled to the other element or an intervening element may also be present. Furthermore, "connected" or "coupled" as used herein may include wireless connection or wireless coupling. As used herein, the phrase "and/or" includes all or any element and all combinations of one or more of the associated listed items.

Those skilled in the art can understand that, unless otherwise defined, all terms (including technical and scientific terms) used herein have the same meanings as those commonly understood by those of ordinary skill in the art to which the disclosure belongs. It should also be understood that terms, such as those defined in commonly used dictionaries, should be interpreted as having a meaning that is consistent with the meaning of the context of the current technology and will not be interpreted in an idealized or overly formal sense unless defined as here.

The disclosure will be further explained below through the description of the embodiments in conjunction with the drawings.

Figure 1:
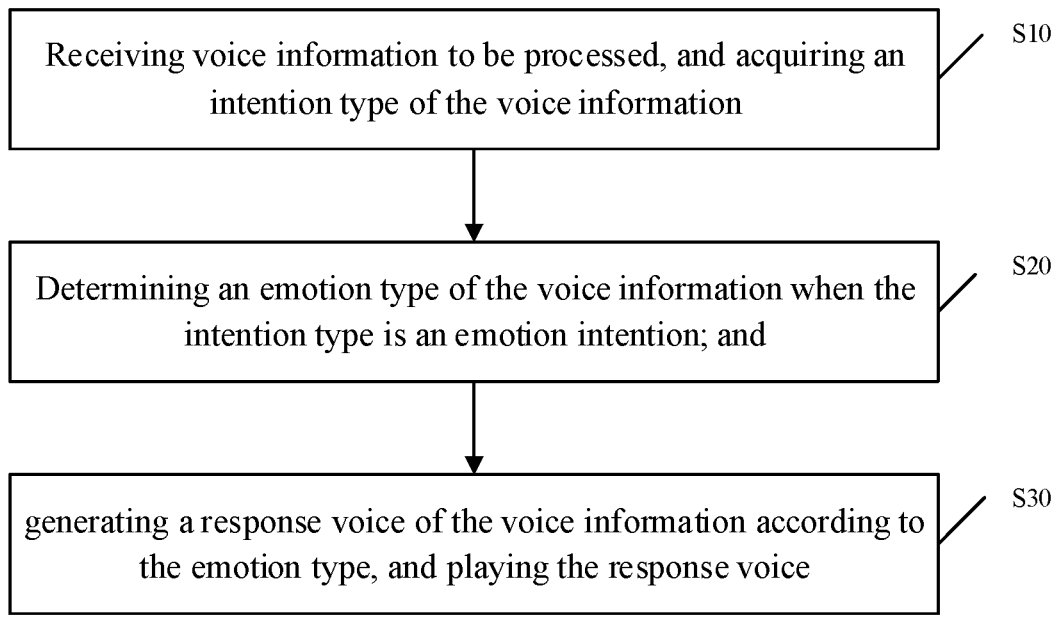
FIG. 1 is a flow diagram of an embodiment of an emotion-based voice interaction method provided by the present disclosure.

The embodiment of the disclosure provides an emotion-based voice interaction method, as shown in FIG. 1. The method includes:

S10, receiving voice information to be processed, and acquiring an intention type of the voice information;

S20, determining an emotion type of the voice information when the intention type is an emotion intention; and S30, generating a response voice of the voice information according to the emotion type, and playing the response voice.

The voice information can be voice input by a user in real time collected by a terminal device through a pickup, and can also be voice sent to the terminal device by external device through a network, and the like. In practical application, in order to reduce the loss of the terminal device caused by voice interaction, an execution main body of the flow shown in FIG. 1 can be a cloud server, that is, the terminal device receives voice information to be processed and sends the voice information to the cloud server, the cloud server can generate response voice according to the obtained voice information and return the response voice to the terminal device, and the terminal device plays the response voice to the user. The terminal device is a terminal device with a voice function. Of course, it should be noted that the executing main body of the flow described in FIG. 1 may also be the terminal device itself.

Figure 2:
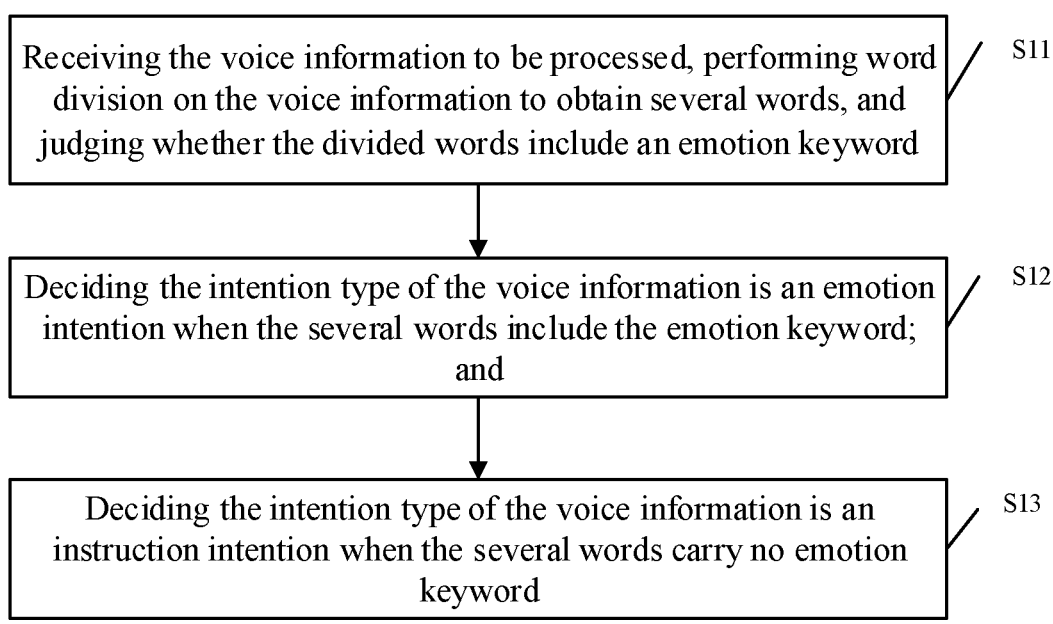
FIG. 2 is a flow diagram of step S10 in an embodiment of the emotion-based voice interaction method provided by the present disclosure.

Further, in the step S10, the intention type refers to the type of meaning that the voice information is expected to express, and the intention type is used for determining a response mode of the voice information, wherein the voice information of different intention types corresponds to different response modes, so that corresponding operations can be quickly performed according to the intention of the user, and the timeliness of voice response can be improved. The intentions include emotion intentions and instruction intentions, wherein the emotion intention refers that the voice information is expected to express an emotion, i.e. the voice information contains an emotion expression, and the instruction intention refers that the voice information is expected to express an operation instructions, i.e. the voice information only contains an instruction expression. In one possible implementation of this embodiment, the intention type may be determined by judging whether the intention type is an emotion intention, and when the intention type is not an emotion intention, the intention type is an instruction intention. The emotion intention may be determined by determining whether the voice information includes an emotion keyword. Correspondingly, as shown in FIG. 2, the receiving voice information to be processed, and acquiring an intention type of the voice information includes:

S11, receiving the voice information to be processed, performing word division on the voice information to obtain several words, and judging whether the divided words include an emotion keyword;

S12, deciding that the intention type of the voice information is an emotion intention when the several words include the emotion keyword; and S13, deciding that the intention type of the voice information is an instruction intention when the several words carry no emotion keyword.

The emotion key words are emotion words and can be preset and stored in a key word database. After word division is carried out on the voice information, all the divided words can be searched in the key word database. If the words are searched, the voice information is decided to include the emotion key word, and if the words are not searched, the voice information is decided to not include the emotion key word. In the embodiment, before the voice information is divided, the voice information needs to be recognized so as to convert the voice information into text information; then the text information is subjected to word division; after word division, the divided words can be subjected to part-of-speech screening, and non-keyword parts-of-speech (e.g. adverbs, personal pronouns and the like) can be deleted so as to improve the searching speed of emotion keywords. The non-key parts-of-speech can be stored in a part-of-speech list in advance. After several words are divided, the part-of-speech of each word can be obtained, and the divided words are screened according to the part-of-speech list so as to remove the words having the part-of-speech attributes in the part-of-speech list, wherein the non-key parts-of-speech is the part-of-speech without an emotion characteristic or an action characteristic, and the emotion characteristics refer to having emotion, and action characteristics refer to having action meaning. For example, the file information corresponding to the voice information is "oh, so tired today", then the text information is subjected to word division to obtain "today", "so tired" and "oh", and the words are screened to obtain "today" and "so tired", wherein the tired in the "so tired" is an emotion keyword, so that the intention type of the voice information can be determined to be the emotion intention. Of course, in a practical application, when the voice information includes no emotion keyword, it can be determined that the intention type of the voice information is the instruction intention.

Further, when each divided word is searched in the keyword database, a plurality of divided words can be included in the keyword database. When a plurality of emotion keywords are searched, whether the emotion types corresponding to the emotion keywords are the same can be judged, and if the emotion keywords are the same, one emotion keyword is selected from the emotion keywords as the emotion keyword of the voice information. When the emotion types corresponding to the plurality of emotion keywords are different, the intention type of the voice information can be determined as the instruction intention. Of course, in practical applications, when the voice information contains a plurality of different types of emotion keywords, mood and intonation corresponding to the voice information can be obtained, and the emotion keywords corresponding to the voice information are determined according to the mood and intonation.

Figure 3:
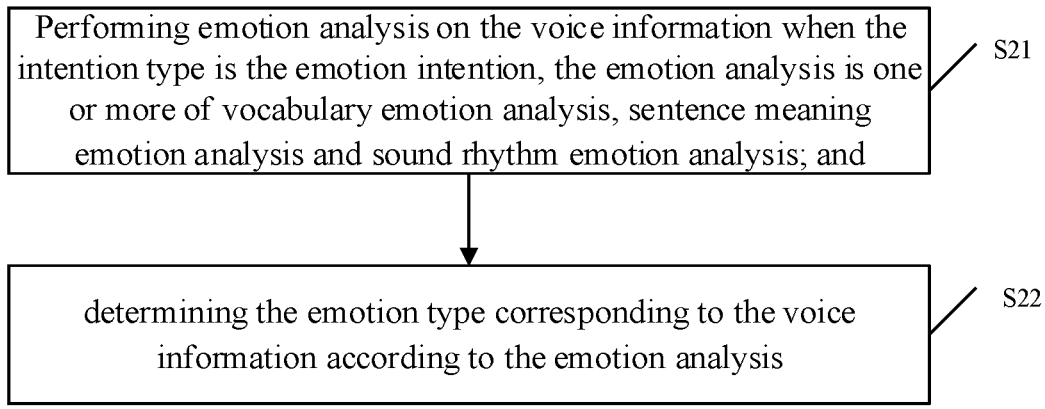
FIG. 3 is a flow diagram of step S20 in an embodiment of the emotion-based voice interaction method provided by the present disclosure.

Further, in the step S20, the emotion type refers to an emotion state of the user, for example, the emotion type can be happy, unhappy, angry, sad, etc. The emotion type can be directly determined according to the emotion keyword, and can also be determined according to the emotion keyword and the whole sentence meaning of the voice information. Correspondingly, as shown in FIG. 3, the when the intention type is an emotion intention, determining an emotion type of the voice information includes:

S21, performing emotion analysis on the voice information when the intention type is the emotion intention, wherein the emotion analysis is one or more of vocabulary emotion analysis, sentence meaning emotion analysis and sound rhythm emotion analysis; and S22, determining the emotion type corresponding to the voice information according to the emotion analysis.

The vocabulary emotion analysis aims at the vocabularies of the voice information. Wherein the emotions of Chinese characters include commendatory words, derogatory words, positive and negative modal particles, curse words, etc. Different vocabulary has its emotion representation. The sentence meaning emotion analysis aims at the vocabularies and complete sentence meaning of voice information through natural language processing and analysis. Wherein the sentence meaning emotion analysis is mainly carried out on the basis of vocabulary emotion analysis. The sound rhythm emotion analysis aims at the sound of the voice information, and predicts emotion through comparing and judging the sound rhythm with historical interaction records and a standard sound emotion rhythm library and the like. Thus, the emotion type corresponding to the voice information can be determined through the emotion analysis including vocabulary emotion analysis, sentence emotion analysis and/or sound rhythm emotion analysis. In the present embodiment, the emotion type of the voice information is preferably determined, i.e. the emotion intention of the voice information is divided using the sound rhythm emotion analysis, e.g. the emotion intention belongs to a sad type, etc. The sound rhythm emotion analysis can also adopt phoneme analysis to determine the emotion type corresponding to the emotion intention. The phonemes may include the pitch, fluctuation, tone and the like of the sound. That is, the corresponding emotion type can be determined according to the pitch, fluctuation, tone and the like of the sound of the voice information. In practical application, the tone range corresponding to each emotion type can be preset, and the tone corresponding to the voice information can be matched with the tone range to determine the emotion type to which it belongs.

In addition, in one embodiment of the present disclosure, the same manner may be used when pitch or fluctuation of the sound is used; or ranges for the pitch, fluctuation and tone of the sound are preset respectively, and then the pitch, fluctuation and tone of the sound are sequentially compared with the corresponding ranges to determine the emotion type corresponding to the pitch, fluctuation and tone of the sound. After determining the emotion type corresponding to the pitch, fluctuation and tone of the sound, the emotion type with large number is selected as the emotion types of the voice information. When the pitch, fluctuation and tone of the sound correspond to different emotion types, respectively, the emotion type corresponding to the voice information is determined according to a preferred level of the pitch, fluctuation and tone of the sound. Wherein, the preferred level of the pitch, fluctuation and tone of the sound is preset. Of course, when the pitch, fluctuation and tone of the sound correspond to different emotion types, respectively, one emotion type can also be randomly selected as the emotion type corresponding to the voice information.

Furthermore, in the step S30, the response voice is voice information generated according to the emotion type of the voice information, and the response voice is generated based on an emotion empathy principle and an emotion guiding principle. Wherein the emotion empathy principle refers to the principle of adopting a same emotion as the voice information carries, and the emotion guiding principle refers to guiding the users to release their emotions directionally. Therefore, the emotion empathy principle and the emotion guiding principle include two parts: an emotion empathy part and an emotion guiding domain part. The emotion empathy part is used for generating emotion resonance with the user, and the emotion guiding domain part is used for providing a mode for relieving emotion for the user. For example, the voice information is "oh, so tired today", and the response voice generated based on the emotion sympathy principle and the emotion guiding principle can be "oh, then relax and have a rest, listen to the music". Wherein "oh, then relax and have a rest" is the emotion sympathy part, and "listen to the music" is the emotion guiding domain, which can also improve the empathy between the response voice and the user to flow the emotion. Correspondingly, generating a response voice of the voice information according to the emotion type, and playing the response voice includes: generating the response voice corresponding to the voice information according to the emotion type based on an emotion empathy principle and an emotion guiding principle, and playing the response voice, wherein the response voice includes an emotion response statement and a function guiding statement. Of course, in practical application, when the response voice of the voice is generated according to the emotion type, the emotion visual image of the corresponding response voice can also be generated, the response voice and the emotion visual image are called, and the corresponding response voice is deduced through the visual image.

Furthermore, in order to improve the resonance between the response statement and the voice information, when the response voice is generated, the voice characteristic of the voice information can be obtained, and the response voice is played by adopting the voice characteristic, so that the response voice conforms to the context of the voice information. Wherein the voice characteristic refers to a voice feature of the voice information, for example, the voice characteristic can include volume, tone, audio and the like. The voice characteristic of the response voice is determined according to the volume, tone and audio, and the response voice is played by adopting the voice characteristic. Of course, in practical application, an user identification (ID) corresponding to the voice information can also be obtained, and the user's speaking format habits, accents, and mantras can be determined according to the user IDs; the response voice can be generated according to the speaking format habits, emotion types and mantras; and the manner of playing response information is determined according to the voice characteristics and accent, and the response information is played in the determined manner.

Furthermore, in one embodiment of the present disclosure, in order to improve the initiative of emotion voice interaction, after response voice is generated according to the emotion type, the times of emotion voice interaction can be recorded, and when the times reach a preset threshold value, a preset initiative emotion mode is automatically started. Correspondingly, included after generating a response voice of the voice information according to the emotion type, and playing the response voice is:

recording a number of the voice information of which the emotion type is the emotion intention, and activating a preset active emotion mode when the number reaches a preset threshold value, wherein a terminal device actively plays voice in the active emotion mode.

The active emotion mode is preset, and when the active emotion mode is activated, the terminal device actively plays voice to the user when the terminal device is started or the voice function is wakened up. Wherein the preset threshold value is preset, for example, 5 and the like. That is to say, when the number of times that the user and the terminal device perform emotion expression reaches 5 times, the terminal device automatically activates the active emotion mode by an active emotion processor, wherein the active emotion processor actively emits voice to the user after started so as to perform emotion interaction with the user. Of course, it should be noted that when the terminal device automatically activates the active emotion mode, the terminal device will immediately actively emit a voice, i.e.

when the terminal device enters the emotion mode, the terminal device emits the voice.

Further, in one embodiment of the present disclosure, the method further includes:

when the intention type is the instruction intention, judging whether the instruction intention is clear, namely judging whether the instruction intention can determine the instruction content; and when the instruction intention cannot determine the instruction content, querying the user in a domain clarification manner until the instruction content can be determined, and executing the instruction corresponding to the instruction intention.

When the instruction intention is what the user needs to execute and the user's current intention cannot determine the instruction content, the inquiry can be made in the form of the domain clarification inquiry to let the user further clarify the intention, and when the instruction intention can determine the instruction content, a corresponding operation is executed according to the instruction intention. For example, the user says "tianmimi (Chinese alphabetic writing)", the smart device generates and plays the query voice in a domain clarification manner "do you want to watch the movie or listen to the song?", and at the moment, if the user says "listen to the song", the smart device determines that the user instruction intention is to play the song "tianmimi", and then the smart device executes the operation of playing the song "tianmimi". In addition, in order to provide the emotion of voice interaction, after the corresponding instruction is executed according to the instruction intention, a corresponding excitation voice can be generated. Correspondingly, the method further includes: when the instruction corresponding to the instruction intention is executed, the excitation voice is generated and played according to the instruction. For example, after performing the operation of playing the song "tianmimi", a voice of "please enjoy it" can be generated and played.

Based on the above-described emotion-based voice interaction method, the disclosure also provides a computer-readable storage medium having one or more programs stored thereon, the one or more programs being executable by one or more processors to implement the steps in the emotion-based voice interaction method as described above.

Figure 4:
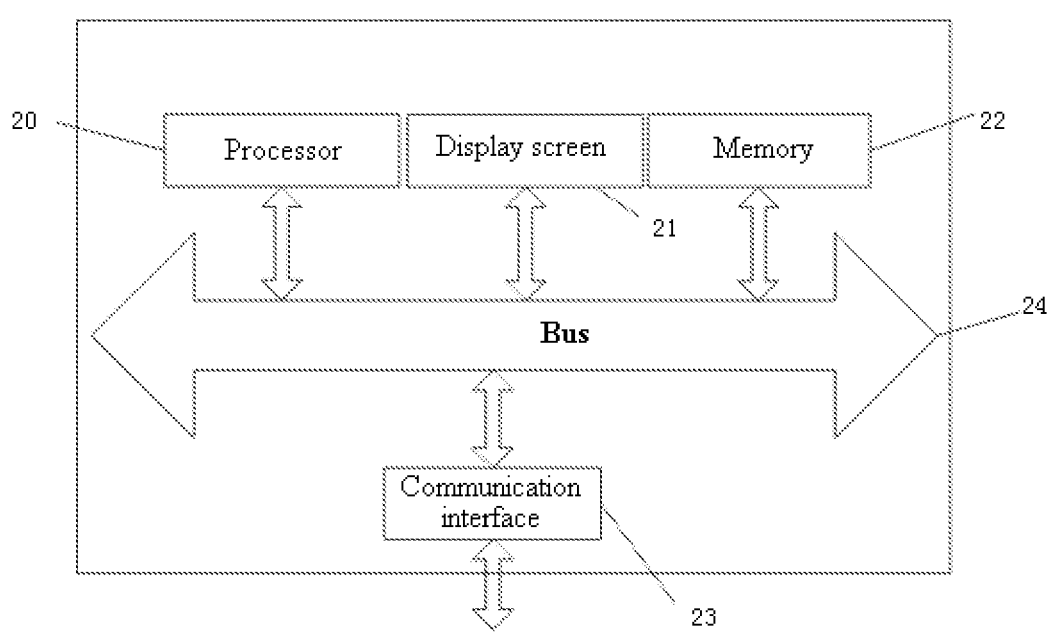
FIG. 4 is a schematic structural diagram of a terminal device provided by the present disclosure.

The disclosure also provides a terminal device, as shown in FIG. 4, including at least one processor 20; a display screen 21; and a memory 22, which may also include a communications interface 23 and a bus 24. Wherein, the processor 20, the display 21, the memory 22 and the communications interface 23 may communicate with each other via the bus 24. The display screen 21 is set to display a user guide interface preset in the initial setting mode. The communications interface 23 may transmit information. The processor 20 may call logical instructions in the memory 22 to perform the methods in the embodiments described above.

Furthermore, the logic instructions in the memory 22 described above may be implemented in the form of a software functional unit, and stored in a computer-readable storage medium when sold or used as a stand-alone product.

The memory 22, as a computer-readable storage medium, may be configured to store software programs, computer-executable programs, program instructions or modules corresponding to the methods in the disclosed embodiments. The processor 20 executes the functional applications and the data processing, i.e. implements the methods in the embodiments described above, by running software programs, instructions or modules stored in the memory 22.

The memory 22 may include a storage program area and a storage data area, wherein the storage program area can store an application program required by an operating system and at least one function; the storage data area may store data or the like created according to the use of the terminal device. In addition, memory 22 may include high-speed random-access memory, and may also include non-volatile memory. For example, a U disk, a removable hard disk, a read-only memory (ROM), a random-access memory (RAM), a magnetic disk, or an optical disk may store program code or may be a transient storage medium.

Furthermore, the processes loaded and executed by the above-described storage medium and the multiple instruction processors in the mobile terminal are have been described in detail in the above-described method and will not be set forth herein.

Finally, it should be noted that: the above embodiments are merely illustrative of the technical solutions of the present disclosure and are not intended to be limiting thereof; although the present disclosure has been described in detail with reference to the foregoing embodiments, those skilled in the art will appreciate that: the technical solutions of the above-mentioned embodiments can still be modified, or some of the technical features thereof can be equivalently replaced; such modifications or substitutions do not depart from the spirit and scope of the various embodiments of this disclosure.

What is claimed is:

1. An emotion-based voice interaction method, wherein comprising:

receiving voice information to be processed, and acquiring an intention type of the voice information;

determining an emotion type of the voice information when the intention type is an emotion intention; and generating a response voice of the voice information according to the emotion type, and playing the response voice;

wherein the receiving voice information to be processed, and acquiring an intention type of the voice information comprises:

receiving the voice information to be processed, performing word division on the voice information to obtain several words, and judging whether the several words being divided comprise an emotion keyword;

when the several words do not comprise the emotion keyword, deciding the intention type of the voice information is the instruction intention; and when the several words comprise the emotion keyword, the acquiring the intention type of the voice information comprises:

acquiring a number of emotion keywords comprised when the several words comprise the emotion keyword;

deciding the intention type of the voice information is the emotion intention when the number is equal to 1;

detecting whether the emotion types corresponding to the emotion keywords are the same when the number is greater than 1, and deciding the intention type of the voice information is the emotion intention if the emotion types corresponding to the emotion keywords are the same; and deciding the intention type of the voice information is an instruction intention if the emotion types corresponding to the emotion keywords are different;

wherein the determining the emotion type of the voice information when the intention type is the emotion intention comprises:

obtaining pitch, fluctuation, and tone of sound of the voice information;

determining a first emotion type corresponding to the pitch by comparing the pitch with a preset pitch range, determining a second emotion type corresponding to the fluctuation by comparing the fluctuation with a preset fluctuation range, and determining a third emotion type corresponding to the tone by comparing the tone with a preset tone range; and when the first emotion type, the second emotion type, and the third emotion type are different, determining the emotion type of the voice information according to a preset preferred level of the pitch, the fluctuation, and the tone.

2. The emotion-based voice interaction method according to claim 1, wherein the receiving the voice information to be processed, performing word division on the voice information to obtain several words, and judging whether the several words being divided comprise an emotion keyword comprises:

receiving the voice information to be processed, and converting the voice information into text information;

dividing the text information into several words, and selecting words meeting a preset condition from the several words being divided; and judging whether the selected words meeting the preset condition comprises the emotion keyword.

3. The emotion-based voice interaction method according to claim 2, wherein the preset condition is that a part-of-speech of a word does not belong to a preset part-of-speech list.

4. The emotion-based voice interaction method according to claim 3, wherein the preset parts-of-speech list comprises non-key part-of-speech, wherein the non-keyword part-of-speech is a part-of-speech without an emotion characteristic or an action characteristic.

5. The emotion-based voice interaction method according to claim 1, wherein the generating a response voice of the voice information according to the emotion type, and playing the response voice comprises:

generating the response voice corresponding to the voice information according to the emotion type based on an emotion empathy principle and an emotion guiding principle, and playing the response voice, the response voice comprises an emotion response statement and a function guiding statement.

6. The emotion-based voice interaction method according to claim 5, wherein the generating the response voice corresponding to the voice information according to the emotion type based on an emotion empathy principle and an emotion guiding principle, and playing the response voice comprises:

generating the response voice corresponding to the voice information according to the emotion type based on the emotion empathy principle and the emotion guiding principle; and acquiring a voice characteristic of the voice information, and playing the response voice according to the voice characteristic.

7. The emotion-based voice interaction method according to claim 5, wherein the generating the response voice corresponding to the voice information according to the emotion type based on an emotion empathy principle and an emotion guiding principle, and playing the response voice comprises:

generating the response voice corresponding to the voice information according to the emotion type based on the emotion empathy principle and the emotion guiding principle; and generating an emotion visual image according to the response voice, and deducing the corresponding response voice through the visual image.

8. The emotion-based voice interaction method according to claim 1, wherein further comprising:

judging whether the instruction intention can determine instruction content when the intention type is the instruction intention; and querying a user in a domain clarification manner until the instruction content can be determined when the instruction intention can determine the instruction content, and executing an instruction corresponding to the instruction intention.

9. The emotion-based voice interaction method according to claim 8, wherein further comprising:

generating and playing an excitation voice according to the instruction when the instruction corresponding to the instruction intention is executed.

10. The emotion-based voice interaction method according to claim 1, wherein before receiving voice information to be processed, and acquiring an intention type of the voice information, comprising:

activating a voice listening mode and actively playing a preset voice when a voice awakening instruction is received.

11. The emotion-based voice interaction method according to claim 1, wherein after generating a response voice of the voice information according to the emotion type, and playing the response voice, comprising:

recording a number of the voice information of which the emotion type is the emotion intention, and activating a preset active emotion mode when the number reaches a preset threshold value, wherein a terminal device actively plays voice in the active emotion mode.

12. The emotion-based voice interaction method according to claim 1, wherein further comprising:

judging whether the instruction intention can determine instruction content when the intention type is the instruction intention; and querying a user in a domain clarification manner until the instruction content can be determined when the instruction intention can determine the instruction content, and executing an instruction corresponding to the instruction intention.

13. A non-transitory computer-readable storage medium, wherein having one or more programs stored thereon, the one or more programs being executable by one or more processors to implement:

receiving voice information to be processed, and acquiring an intention type of the voice information;

determining an emotion type of the voice information when the intention type is an emotion intention; and generating a response voice of the voice information according to the emotion type, and playing the response voice;

wherein the receiving voice information to be processed, and acquiring an intention type of the voice information comprises:

receiving the voice information to be processed, performing word division on the voice information to obtain several words, and judging whether the several words being divided comprise an emotion keyword;

when the several words do not comprise the emotion keyword, deciding the intention type of the voice information is the instruction intention; and when the several words comprise the emotion keyword, the acquiring the intention type of the voice information comprises:

acquiring a number of emotion keywords comprised when the several words comprise the emotion keyword;

deciding the intention type of the voice information is the emotion intention when the number is equal to 1;

detecting whether the emotion types corresponding to the emotion keywords are the same when the number is greater than 1, and deciding the intention type of the voice information is the emotion intention if the emotion types corresponding to the emotion keywords are the same; and deciding the intention type of the voice information is an instruction intention if the emotion types corresponding to the emotion keywords are different;

wherein the determining the emotion type of the voice information when the intention type is the emotion intention comprises:

obtaining pitch, fluctuation, and tone of sound of the voice information;

determining a first emotion type corresponding to the pitch by comparing the pitch with a preset pitch range, determining a second emotion type corresponding to the fluctuation by comparing the fluctuation with a preset fluctuation range, and determining a third emotion type corresponding to the tone by comparing the tone with a preset tone range; and when the first emotion type, the second emotion type, and the third emotion type are different, determining the emotion type of the voice information according to a preset preferred level of the pitch, the fluctuation, and the tone.

14. A terminal device, comprising: a processor and a memory;

the memory having a computer-readable program executable by the processor stored thereon; and the processor, when executing the computer-readable program, implementing:

receiving voice information to be processed, and acquiring an intention type of the voice information;

determining an emotion type of the voice information when the intention type is an emotion intention; and generating a response voice of the voice information according to the emotion type, and playing the response voice;

wherein the receiving voice information to be processed, and acquiring an intention type of the voice information comprises:

receiving the voice information to be processed, performing word division on the voice information to obtain several words, and judging whether the several words being divided comprise an emotion keyword;

when the several words do not comprise the emotion keyword, deciding the intention type of the voice information is the instruction intention; and when the several words comprise the emotion keyword, the acquiring the intention type of the voice information comprises:

acquiring a number of emotion keywords comprised when the several words comprise the emotion keyword;

deciding the intention type of the voice information is the emotion intention when the number is equal to 1;

detecting whether the emotion types corresponding to the emotion keywords are the same when the number is greater than 1, and deciding the intention type of the voice information is the emotion intention if the emotion types corresponding to the emotion keywords are the same; and deciding the intention type of the voice information is an instruction intention if the emotion types corresponding to the emotion keywords are different;

wherein the determining the emotion type of the voice information when the intention type is the emotion intention comprises:

obtaining pitch, fluctuation, and tone of sound of the voice information;

determining a first emotion type corresponding to the pitch by comparing the pitch with a preset pitch range, determining a second emotion type corresponding to the fluctuation by comparing the fluctuation with a preset fluctuation range, and determining a third emotion type corresponding to the tone by comparing the tone with a preset tone range; and when the first emotion type, the second emotion type, and the third emotion type are different, determining the emotion type of the voice information according to a preset preferred level of the pitch, the fluctuation, and the tone.

\* \* \* \* \*